United States Patent [19]
Cafarelli

[11] Patent Number: 5,499,896
[45] Date of Patent: Mar. 19, 1996

[54] COMBINED DRILL SCREW WITH REAMER

[76] Inventor: Robert S. Cafarelli, 467 Flag Branch Rd., Greenville, Tenn. 37743

[21] Appl. No.: 265,379

[22] Filed: Jun. 23, 1994

[51] Int. Cl.⁶ .................................................. F16B 25/00
[52] U.S. Cl. ............................................ 411/387; 408/224
[58] Field of Search ..................................... 411/386, 387, 411/29–31; 408/224, 225

[56] References Cited

U.S. PATENT DOCUMENTS

| 296,991 | 4/1884 | Mitchell | 411/387 |
|---|---|---|---|
| 3,682,038 | 8/1972 | Lejdegärd | 411/387 |
| 4,034,641 | 7/1977 | Williams | 411/387 |
| 4,222,689 | 9/1980 | Fujuwara . | |
| 4,645,396 | 2/1987 | McCauley . | |
| 4,793,756 | 12/1988 | Baumgartner . | |
| 4,958,972 | 9/1990 | Shinjo . | |
| 5,046,905 | 9/1991 | Piacenti . | |
| 5,403,137 | 4/1995 | Grün | 411/387 |

FOREIGN PATENT DOCUMENTS

| 2549147 | 5/1977 | Germany | 411/387 |
|---|---|---|---|
| 50995 | 1/1910 | Switzerland | 411/387 |
| 2067440 | 7/1981 | United Kingdom | 408/224 |

*Primary Examiner*—Flemming Saether
*Attorney, Agent, or Firm*—McHale & Slavin

[57] ABSTRACT

The present invention is a drill screw including a shank having a head at one end, a drill bit at the other end and a threaded section therebetween. The threaded section and the drill bit are operatively adapted such that drilling with the bit is performed by torquing the shank in a rotational direction opposite to that used to screw the threaded section into a bore hole.

7 Claims, 1 Drawing Sheet

COMBINED DRILL SCREW WITH REAMER

FIELD OF THE INVENTION

The present invention relates generally to fasteners, and more particularly to a combination drill and screw.

BACKGROUND OF THE INVENTION

A variety of combination drill screws are known in the art. Such drill screws typically include a head shaped to permit torquing of a shank having a threaded section with a drill bit formed at its leading end. The drill bit is used to produce a hole into a work piece upon rotation of the shank in a clockwise direction.

Drill screws are used to fasten components where drilling is necessary to first produce a hole yet speed necessitates quick attachment or ease of assembly seeks to eliminate the drilling step during attachment. The drill bit formed on the end of the shank is of a length suitable for boring a hole through a wall or other attachment fixture. Thus, drill screws simply allow fastening in a single operation rather than a two or three step process; that is, separately drilling a bore hole and torquing in a screw. For a number of applications, the conventional drill screw has proven inadequate. For instance, attempts at securing a railing bracket or other such object to a fiberglass boat hull using prior art drill screws often results in cracks propagating from the bore hole as the threaded section of the shank is screwed into the hole. Such cracks can be cosmetic in nature and mar the aesthetic qualities of the work piece, such as cracks formed in the gel-coat layer used to coat the fiberglass hulls of boats. However, cracks may have also affect the structural integrity of the screw anchorage by allowing the threaded section to loosen and back or fall out of the bore hole. To prevent such cracks from forming, a pilot hole must be drilled completely through the work piece forming a clean hole for insertion of the screw, thus making the conventional screw drill inadequate. It is imperative that the drilled hole is completely formed before insertion of the screw. If even a small portion of hole is not completed, insertion of a screw will cause pressure to be formed on the sidewall of hole during screw insertion. Conventional drill screws do not form a complete hole during the drilling process since the screw begins insertion as soon as the threads engage a portion of the partial drilled hole.

Prior drill screws are designed such that their threaded section immediately begins to screw into the bore hole once the threads reach the surface of the work piece. It has been found that when the inner surface of the bore hole is rough, cracks are more likely to form in the work piece as the threaded section is screwed into the bore hole. Such roughening typically results from chips or other pieces of the work piece not being fully cut from the work piece and removed from the bore hole by the drill bit during the drilling operation (i.e., from the hole not being substantially reamed smooth).

Work pieces made of material such as fiberglass are particularly susceptible to such crack formation when the inner surface of their bore hole is not substantially smooth. When a bore hole is drilled through a walled work piece, it is often necessary to move the drill bit in and out of the bore hole numerous times or allow the bit to rotate in the hole numerous revolutions in order to obtain a bore hole with a such a smooth inner surface. Because prior drill screws are designed to drill and screw in the same direction of rotation, it is difficult to ream the bore hole smooth in this manner without at least partially screwing and unscrewing the threaded section of the drill screw in and out of the bore hole. Such screwing and unscrewing can result in a looser fit between the drill screw and the work piece and a corresponding drop in the integrity of the anchorage.

If chips or other pieces of the work piece material are not removed from the bore hole before the threaded section is screwed in, these pieces will be trapped within the hole and wedge between the threaded section and the work piece. Such a wedge tends to cock or misalign the drill screw relative to the bore hole and cause even greater stresses to be applied to the surrounding material. These greater stresses in turn increase the likelihood of cracks being generated and then propagated. In addition, especially when the work piece is made of metal material (e.g., steel), these trapped pieces can cause the threaded section to bind-up in the hole. This increases the likelihood of the drill screw being over torqued, ultimately causing the drill screw to fracture. This is especially true for aluminum or steel drill screws.

Therefore, there is a need for an improved drill screw capable of drilling a completed bore hole before anchoring the screw into the hole thus allowing fastening to a walled work piece without the use of additional tools further eliminating associated stress around the bore hole.

SUMMARY OF THE INVENTION

The present invention solves the aforementioned problems by providing a drill screw which is capable of drilling a complete bore hole with a substantially smooth inner surface before its threaded section is able to engage the hole.

It is therefore an objective of the present invention to provide a drill screw capable of drilling a hole through and fastening an object to a walled work piece without having to use additional tools, by means of providing a drill and screw shank having opposing rotations.

An additional objective of the present invention is to provide a drill screw that is less likely to require the drilling of a pilot hole through a walled work piece before fastening something to the work piece with the drill screw.

Another objective of the present invention is to provide a drill screw which is less likely to generate cracks as its threaded section is screwed into a bore hole formed by its drill bit through a walled work piece.

Still another objective of the present invention is to provide a drill screw that is less likely to fracture while being screwed into a work piece and can be made to split off the drill bit if space is limited.

A further objective of the present invention is to provide a drill screw that is less susceptible to being overtorqued during its installation.

The above and other objectives of the present invention are obtained by providing a drill screw which includes a headed shank having a threaded section with a drill bit formed at its leading end. The threaded section and drill bit are operatively adapted such that drilling with the bit is performed by torquing the shank in a rotational direction opposite to that used to screw-in the threaded section. For example, the threaded section could be formed with a conventional right-hand continuous thread (i.e., to screw in clockwise) and the drill bit formed unconventionally to drill only counter-clockwise. Because the threads and the drill bit operate in opposite directions, once a bore hole is drilled through the wall of a work piece, the drill bit can be rotated numerous revolutions to clean out the bore hole (i.e., substantially smooth its inner surface) without the threads unintentionally engaging and screwing into the bore hole so formed. Preferably, the length of the drill bit portion of the present drill screw is generally equal to or longer than the thickness of the work piece wall being drilled.

At least a portion of the present drill bit extends out the back of the work piece wall after the threaded section is screwed in. Thus, in cases where a protruding drill bit is unacceptable, the present drill screw can be modified to include a shank that is operatively adapted so at least the portion of the drill bit extending out of the bore hole can be easily broken off, leaving the remainder of the drill screw substantially undisturbed and secured in the work piece.

In another embodiment of the present drill screw, the portion of the threaded section transitioning to the drill bit is operatively adapted to form a bevel in the work piece around the entrance to the bore hole as the drill screw is rotated in the direction used for drilling. The bevel can be made by use of rounded screw treads placed along the beginning section of the bit.

The above and other objectives, features and advantages of the present invention will become apparent upon consideration of the detailed description and the appended drawings.

DETAILED DESCRIPTION OF THE INVENTION

Although the present invention is herein described in terms of a specific embodiment, it will be readily apparent to those skilled in the art that various modifications can be made without departing from the spirit of the invention. The scope of the present invention is thus only limited by the claims appended hereto.

Figure 1:
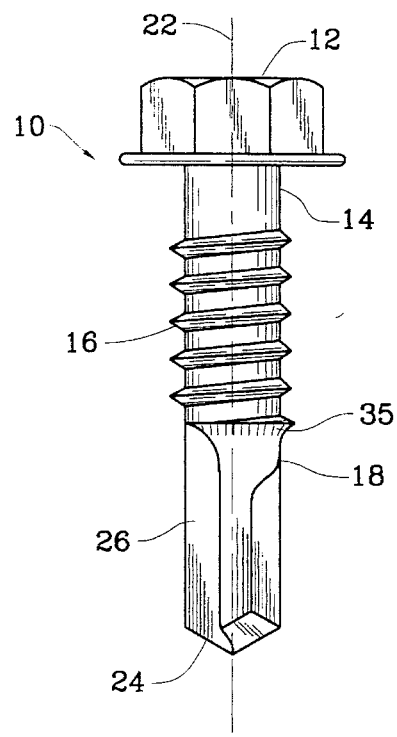
FIG. 1 is a plan view of one embodiment of a drill screw according to the present invention.

Referring to FIG. 1, a drill screw 10 according to the present invention is illustrated having a conventional hex head 12 formed at the trailing end of a shank 14 having a threaded section 16 with a drill bit 18 formed at its leading end. The head 12 is a conventional screw head and may have hex, phillips, or other fastening capability. The threaded section 16 of shank 14 has a right-hand continuous thread suitable for threadably engaging or screwing into a bore hole 20 when the drill screw 10 is rotated about its central longitudinal axis 22 in a clockwise direction as depicted by arrow 23 (see FIG. 2A). The drill bit 18 includes cutting edge 24 and an upwardly extending drilling flute 26 configured for carrying material removed or cut by the cutting edge 24 generally axially upwardly and radially outwardly away from the cutting edge 24 as the drill screw 10 is rotated counter-clockwise about its axis 22 as depicted by arrow 27 (see FIG. 2A). Because the drill bit 18 is rotated in an opposite direction during drilling (counter-clockwise for this embodiment), threaded section 16 cannot engage and screw into bore hole 20.

Figure 2:
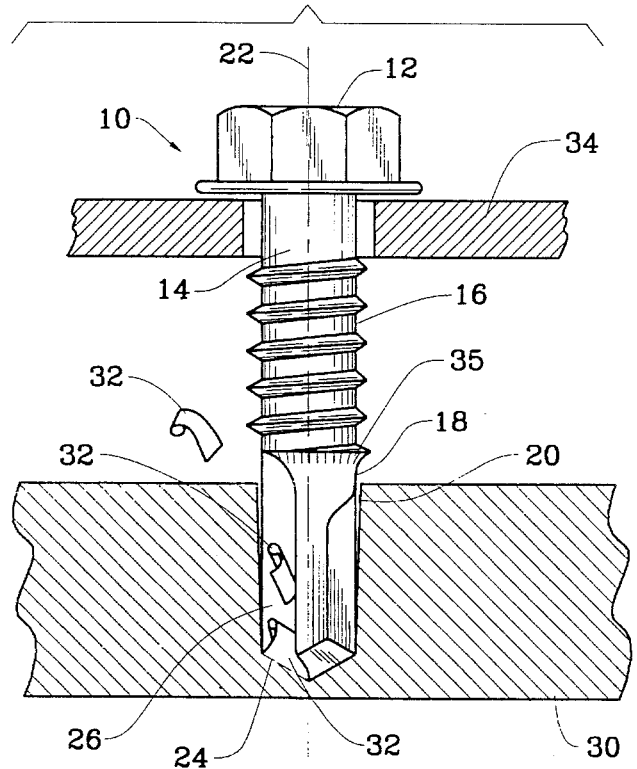
FIG. 2 is a partially sectioned side view of the drill screw of FIG. 1, with its drill bit fully embedded in and removing chips of a work piece.
Figure 2A:
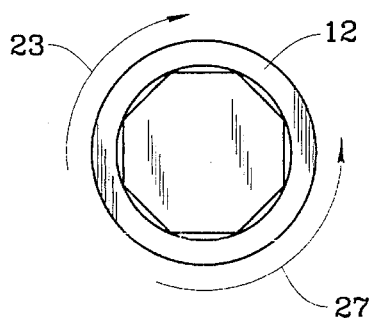
FIG. 2A is a top view of the head of the drill screw of FIG. 2.

Referring to FIG. 2, the length of drill screw bit 18 is at least about equal to the thickness of the wall of a work piece 30 to be drilled. When the present drill screw 10 is used to drill a bore hole 20 through the walled work piece 30, the cutting edge 24 cuts chips 32 of the work piece material as the bit 18 is drilled through the work piece 30. Once bit 18 drills through the wall of work piece 30, the counter-clockwise rotation of drill screw 10 is continued until all of the chips 32 are removed from bore 20 and the inner surface of bore 20 is substantially smooth, (i.e., until bore hole 20 is suitably reamed out). A plurality of edged ridges 35 are preferably formed around the circumference of shank 14 between the threaded section 16 and drill bit 18. These ridges 35 are intended to form a bevel in the work piece around the entrance to hole 20 as the bore is reamed out. The rotation of drill screw 10 is then reversed and threaded section 16 screwed into bore hole 20 in order to fasten an object such as a bracket 34 to the work piece 30.

Figure 3:
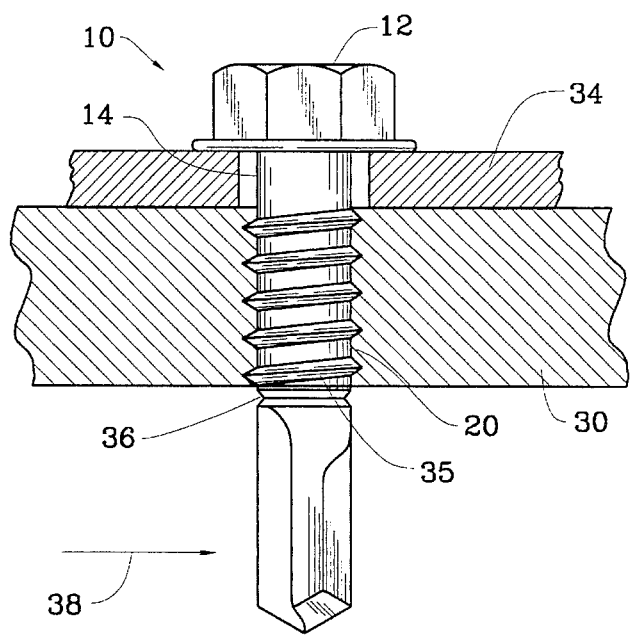
FIG. 3 is a partially sectioned side view showing a modified version of the drill screw of FIG. 2 securing a bracket to the work piece.

Referring to FIG. 3, it may be undesirable for a substantial portion of the drill screw 10 to extend out of bore hole 20 beyond work piece 30. Therefore, the shank 14 can be modified so that all or most of the protruding portion of drill screw 10 can be easily broken off without substantially disturbing the screw-to-work piece anchorage. The protruding portion of drill screw 10 can be made readily breakable by forming a circumferential V-notch groove 36 in the shank 14 between the threaded section 16 and the drill bit 18. Notch 36 acts as a stress concentrator making the shank 14 susceptible to fracturing when a force, as depicted by arrow 38, is applied to bit 18 perpendicular to axis 22. Drill screw 10 could also be made breakable by any other suitable structure including that disclosed in U.S. Pat. No. 4,958,972 which is incorporated herein by reference in its entirely.

From the above disclosure of the general principals of the present invention and the preceding detailed description, those skilled in this art will readily comprehend the various modifications to which the present invention is susceptible. Therefore, the scope of the invention should be limited only by the following claims and equivalents thereof.

What is claimed is:

1. A drill screw with reamer comprising:

a shank having a head at a first end, a drill bit at a second end and a threaded section therebetween, said threaded section having a continuous screw thread according to right-hand clockwise convention with a bevel means disposed at an end of said screw thread adjoining said drill bit, said drill bit having a counter-clockwise cutting bit being operatively adapted such that drilling with said bit is performed only by rotating said shank in a counter-clockwise rotational direction opposite to that used to screw said threaded section; wherein said drill screw is attached to a solid structure by releasably securing a rotatable tool to said drill screw head placing said second end against the solid structure, rotating said drill screw in a counter-clockwise rotation forms a hole through a with said bevel means preventing said drill bit from entering the formed hole and further providing a reaming of an outer edge of the formed hole, reversing the rotation of said drill screw permits said threaded portion to enter the formed hole allowing securement thereto.

2. The drill screw of claim 1 including a V-notch groove disposed between said bevel means and said drill bit allowing for ease if detachment of said drill bit from said threaded section allowing said drill screw to operate a conventional threaded screw.

3. The drill screw of claim 2, said means including a circumferential V-notch groove formed in said shank.

4. The drill screw of claim 2, said means including a circumferential V-notch groove formed in said shank between said threaded section and said drill bit.

5. The drill screw of claim 1 wherein said bevel means includes a plurality of edged ridges to enhance reaming of the outer edge of the formed hole.

6. A drill screw with reamer comprising:

a shank having a head at a first end, a drill bit at a second end and a threaded section therebetween, said threaded section having a continuous screw thread according to right-hand clockwise convention with a bevel means having a plurality of edged ridges disposed at an end of said screw thread adjoining said drill bit, said drill bit having a counter-clockwise cutting bit being operatively adapted such that drilling with said bit is performed by rotating said shank in a counter-clockwise rotational direction opposite to that used to screw said threaded section; wherein said drill screw is attached to a solid structure by releasably securing a rotatable tool to said drill screw head placing said second end against the solid structure, rotating said drill screw in a counter-clockwise rotation forms a hole through a with said bevel means preventing said drill bit from entering the formed hole and further providing a reaming of an outer edge of the formed hole, reversing the rotation of said drill screw permits said threaded portion to enter the formed hole allowing securement thereto.

7. The drill screw reamer of claim 6 including a V-notch groove disposed between said bevel means and said drill bit allowing for the detachment of said drill bit from said threaded section.

* * * * *